(12) United States Patent
Kim et al.

(10) Patent No.: US 8,301,078 B2
(45) Date of Patent: Oct. 30, 2012

(54) FORWARDING SCHEMES FOR COOPERATIVE RELAY GROUPS

(75) Inventors: Sang G. Kim, San Diego, CA (US);
Ki-Dong Lee, San Diego, CA (US);
Byung K. Yi, San Diego, CA (US)

(73) Assignee: LG Electronics Inc., Seoul (KR)

( * ) Notice: Subject to any disclaimer, the term of this patent is extended or adjusted under 35 U.S.C. 154(b) by 1124 days.

(21) Appl. No.: 12/172,087

(22) Filed: Jul. 11, 2008

(65) Prior Publication Data
US 2009/0017753 A1 Jan. 15, 2009

Related U.S. Application Data

(60) Provisional application No. 60/949,817, filed on Jul. 13, 2007, provisional application No. 61/028,622, filed on Feb. 14, 2008.

(51) Int. Cl.
*H04B 7/15* (2006.01)

(52) U.S. Cl. ............. 455/10; 455/25; 455/7; 370/211

(58) Field of Classification Search ................ None
See application file for complete search history.

(56) References Cited

U.S. PATENT DOCUMENTS

| 6,400,699 B1 | 6/2002 | Airy et al. | |
| 7,720,020 B2 * | 5/2010 | Larsson | 455/16 X |
| 2005/0014464 A1 * | 1/2005 | Larsson | 455/11.1 |
| 2007/0165581 A1 * | 7/2007 | Mehta et al. | 370/338 |
| 2008/0317168 A1 * | 12/2008 | Yang et al. | 375/298 |

FOREIGN PATENT DOCUMENTS

| EP | 1806945 | 7/2007 |
| WO | 2006125137 | 11/2006 |
| WO | 2007/064249 | 6/2007 |

OTHER PUBLICATIONS

Pabst et al., "Wireless World Research Forum: Relay-Based Deployment Concepts for Wireless and Mobile Broadband Radio," IEEE Communications Magazine, Sep. 2004, pp. 80-89, XP-002609720.
Xiaojian et al., "Performance Analysis of Multihop Inter-Vehicle Communications with Two-Relay Collaboration," Jul. 2006, XP-031056617.

* cited by examiner

*Primary Examiner* — Philip Sobutka
(74) *Attorney, Agent, or Firm* — Lee, Hong, Degerman, Kang & Waimey

(57) ABSTRACT

A method for communicating data from a source to a destination using a plurality of relay stations in a wireless communication system is provided. The method comprises grouping the plurality of relay stations into at least one relay station group; receiving in a relay station group a subset of data transmitted from the source; sharing information between relay stations in the relay station group for forwarding to the destination the received subset of data transmitted from the source; determining a forwarding scheme for transmitting the received subset of data; and transmitting the received subset of data to the destination using the forwarding scheme.

14 Claims, 8 Drawing Sheets

(a)

(b)

(a)

(b)

(a)

(b)

FORWARDING SCHEMES FOR COOPERATIVE RELAY GROUPS

CROSS-REFERENCED TO RELATED APPLICATIONS

This application claims the benefit of U.S. Provisional Application No. 60/949,817, filed on Jul. 13, 2007 and U.S. Provisional Application No. 61/028,622, filed on Feb. 14, 2008, the contents of which are hereby incorporated by reference in this application.

TECHNICAL FIELD

The present invention relates to a method of transmitting reliable and higher data communicated in a mobile communication system with relays.

BACKGROUND

Referring to FIG. 1, certain mobile communications networks include relay nodes (R) that operate in cooperative fashion to decode and forward data communicated from a source node (S) to a destination node (D). A mobile terminal (S) thus may be connected to the base station (D) directly or through a relay node (R). If a mobile terminal has no relays around it, the mobile terminal is connected to the base station directly. However, if a mobile terminal is in the proximity of a relay node and if using the relay node is better in terms of certain metrics, such as energy consumption, etc. the terminal may be connected to the base station through the relay node.

In wireless networks, where mobile terminals communicate via relay nodes, signal to noise ratio (SNR) of those links in cooperative transmission frequently generate imbalance in transmit power. For example, suppose that there are one source node, one relay node, and one destination node. Given that the transmit power levels are unbalanced, one node consumes more power than it eventually contributes to the throughput that the destination node may achieve, whereas the other node causes a lower-limit in the throughput.

As shown in FIG. 1, in a decode and forward scenario, series of time frames are utilized, where each time frame has two time slots. In the first time slot, the source node transmits at power level P1, and the relay and destination nodes receive the signal from the source node. In the second time slot, the relay forwards the information received from the source node to the destination node and the destination node combines the two signals, one directly from the source node and the other relayed by the relay node, to take advantage of cooperation diversity among the nodes.

Communication through relay nodes as studied in the context of cellular networks has the following benefits: (1) it significantly reduces a transmit power requirement for the same data rate compared to those for a base station, thus permitting economical amplifier design in the relay; (2) it eliminates the costs associated with building a wired infrastructure that serves as the interface between the base station and backend systems; and (3) it significantly increases a data transmission rate for the same power compared to those for a base station, thus potentially solving the coverage problem for high data rates in larger cells.

In a cooperative relay network, it is assumed that information available at a certain relay may be shared among a subset of relays or all relays. Two broad categories of cooperative relaying techniques are cooperative diversity (C-DIV) and cooperative spatial multiplexing (C-SM). In C-DIV each relay may be considered as an antenna element in distributed antenna array. Cooperation at the relays is done in such a way to provide increased reliability of reception, such as bit error rate, through the diversity gain at the destination. A typical example is space time block code (STBC) encoding at the relays, e.g., Alamouti encoding.

In C-SM each relay is responsible to detect a subset of transmitted information (data stream) from the source. For example, consider that the source transmits a 16 QAM signal and 4 relays are in the system. Each relay may detect one bit information out of the incoming 16 QAM signal and transmits extracted one bit information using a BPSK signal. All relays forward their low-rate sub-streams simultaneously to the destination over the same physical channel. It may reduce the required transmission power by reducing the transmission rate per relay while maintaining the same $E_b/N_0$ requirement. Reduced transmission power provides less interference, thus increased capacity.

In C-DIV each relay needs to process and transmit at the same data rates as the one the source generates. Unfortunately, for high-rate data, hardware complexity and energy consumption on each relay may be substantial. Furthermore, incorrect estimation of the transmitted signal at the relays propagates to the destination, thus diversity gain may not be achieved. Also, in C-SM further enhancement in terms of bit error rate (BER) or frame error rate (FER) are needed when some sort of transmit diversity is incorporated. System architectures for cooperative relay-based communication systems are needed that may support both C-DIV and C-SM.

SUMMARY

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

A method for communicating data from a source to a destination using a plurality of relay stations in a wireless communication system is provided. The method comprises grouping the plurality of relay stations into at least one relay station group; receiving in a relay station group a subset of data transmitted from the source; sharing information between relay stations in the relay station group for forwarding to the destination the received subset of data transmitted from the source; determining a forwarding scheme for transmitting the received subset of data; and transmitting the received subset of data to the destination using the forwarding scheme.

Depending on implementation, the forwarding scheme may comprise a space time coding scheme, a selection diversity scheme or a beam forming scheme. One or more relay stations in the relay station group provide a diversity gain for the received subset of data, or a spatial multiplexing gain for data transmitted from the source. The forwarding scheme may be based on a command received from the destination or a decision made by the relay station group. The number of relay stations in the relay station group or the number of relay station groups may vary according to a function of time. Moreover, the number of relay stations in the relay station group or the number of relay station groups may be different for different sources. For example, relay station groupings for source 1 (user 1) may be different from those of source 2 (user 2).

In one embodiment, at least one relay station in the relay station group is involved in the forwarding scheme, such that the relay station is a mobile or a fixed station. The information shared by the relay stations in the relay station group comprises at least one of an instantaneous amplitude; a signal-to-noise ratio; reliability of the received subset of data; a decoded subset of data; and reliability of the decoded subset of data. At least two relay stations in the relay station group may select one or more relay stations for transmitting an output to the destination.

In one implementation the relay station group transmission is spread using a spreading code and the received subset of data transmitted from the source is channel coded. The plurality of relay stations may be divided into the at least one relay station group according to a signal quality, the link quality or the traffic load of each relay station.

The number of relay stations in a relay station group provided may be variable according to a base station instruction. Each relay station receives a message transmitted from a base station when a relay station group of the relay station is configured. The message, for example, comprises at least one of an identification of the relay station group; message type information; bit map information; a type of forwarding scheme; a number of relay stations in the relay station group; identifications of the relay stations in the relay station group; a set of weighing coefficients if the message comprises a specific type of forwarding scheme; an identification of a master relay station if the message comprises a specific type of forwarding scheme; a modulation order; bit position indices; and information for generating a spreading sequence for a transmission from the relay station group. The message may also comprise at least one of a broadcast identification; a mode of operation; modulation order; and bit position indices.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

In accordance with a non-limiting embodiment, one or more exemplary architectures for relay-based cooperative communications are provided that simultaneously support diversity gain for better reception quality and multiplexing gain for capacity enhancement. The exemplary architectures are flexible so that they support at least one or both of full diversity gain in one extreme or full multiplexing gain in the other extreme. In one embodiment, a channel coding scheme may be employed in one or more of said example architectures. Adaptive operation based on reception quality in combination with channel coding may be also employed in such a way that the decoding may be discontinued when the reception quality does not meet a certain criterion (i.e., threshold).

Figure 1:
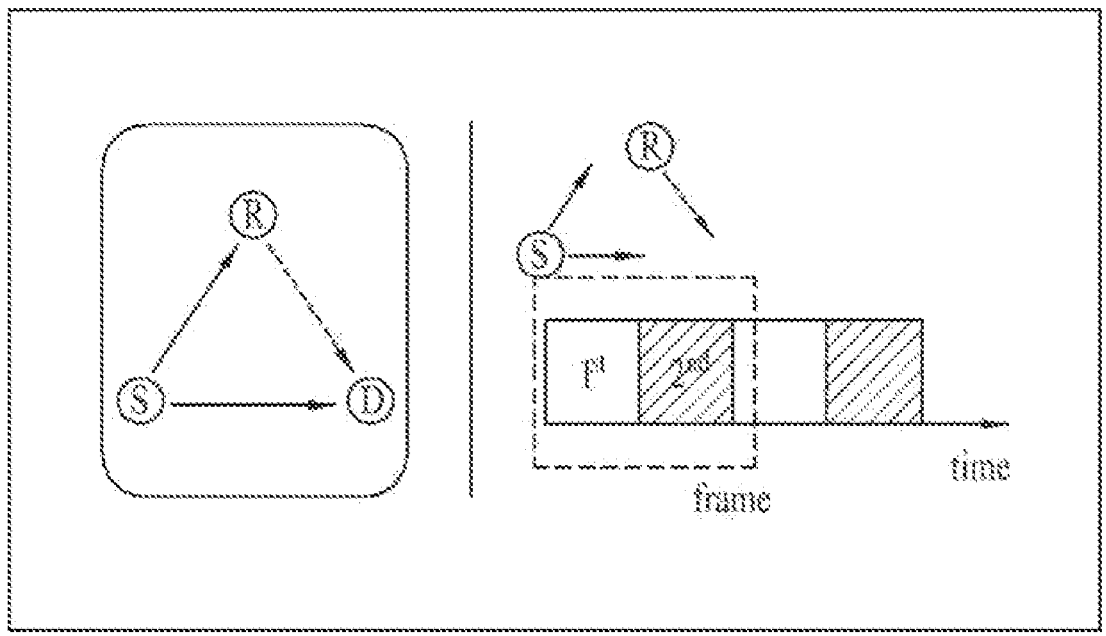
FIG. 1 is an exemplary system environment illustrating the topology of a cooperative mobile communication network, in accordance with one embodiment.
Figure 2:
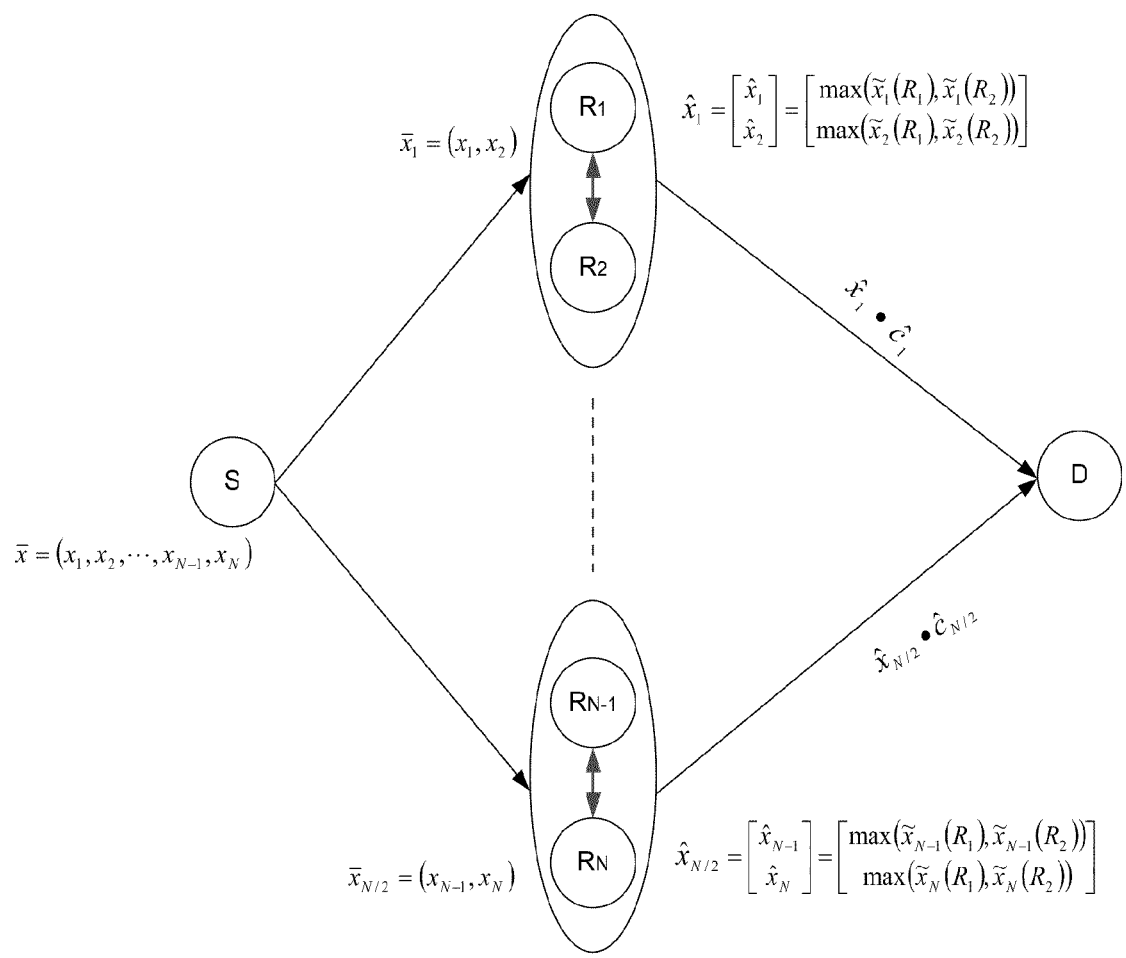
FIGS. 2 through 4 illustrate exemplary architectures for communicating data from a source to a destination using a plurality of relay stations in a wireless communication system, in accordance with one or more embodiments.

Referring to FIG. 2, an example relay network architecture is illustrated the source and destination communicate through a group of N relays (R1, R2, ..., $R_N$). Accordingly, each relay belongs to a subgroup comprising a subset of N relays. Consider two subgroups of 4 relays as an example, $R_1$ and $R_2$ may belong to subgroup 1; and $R_3$ and $R_4$ may belong to subgroup 2. Relays in the same subgroup share the information necessary for cooperative forwarding of received subsets of data that are transmitted from a source (S) to a destination (D). The destination may be equipped with more than one antenna element. Moreover, the number of relays in the subgroup is adjustable depending on a situation. For example, a lower number of relays per subgroup may be used during the evening, therefore providing more cooperative spatial multiplexing (C-SM) gain.

As shown in FIG. 2, in a first exemplary architecture (architecture 1), each subgroup is responsible to detect and forward a subset of transmitted data streams. Let us assume, for example, that each subgroup comprises two relays and forwards two source data symbols. Then, the transmission rate at the output of the subgroup ($R_{subgroup}$) is given by Equation (1), where $N_{subgroup}$ is the number of relays per subgroup and $R_{source}$ is the transmission rate at the source.

$$R_{subgroup} = \alpha(N_{subgroup}) \cdot \left(\frac{R_{source}}{N}\right) \quad (1)$$

α is the ratio of the number of source to relay bits in the modulation symbols generated from the source and relay. For example, if the source transmits the data using a 16 QAM signal with 4 bit information and the relay generates an 8 PSK signal with 3 bit information from the received 16 QAM signal, then α=(4/3). If α>1, some bits are redundantly generated in the relays and more reliable information for those bits can be delivered to the destination. These bits can be systematic bits in some channel coding schemes (e.g. turbo code, LDPC, etc.) and/or unequally and unfavorably treated bits in some signal constellation (e.g. 16 QAM, 64 QAM, etc.).

In one implementation, if $N_{subgroup}=N$ and $\alpha=1$, then we have a full C-DIV with the same transmission rate as the source. If $N_{subgroup}=1$ and $\alpha=1$, then we have a full C-SM with the transmission rate reduced by the number of relays, N. Hence, by adjusting the number of relays in the subgroup, we have a tradeoff between the diversity gain and the multiplexing gain. Information shared by the relays in the subgroup may comprise the instantaneous received amplitude, signal-to-noise ratio (SNR), reliability of received signals that the subgroup is supposed to detect, etc.

For example, in FIG. 2, the subgroup 1 is configured to detect the transmitted symbols $x_1$ and $x_2$. Relays 1 and 2 share the information (decision metric) on $x_1$ and $x_2$ (e.g., $(\tilde{x}_1(R_1)$, $\tilde{x}_2(R_2))$ and $(\tilde{x}_2(R_1), \tilde{x}_2(R_2)))$ and decide a certain relay is responsible to transmit a certain data symbol, and transmit the data symbol accordingly. That is, relay 1 may be responsible both for the transmission of $x_1$ and $x_2$, or one of them.

In one embodiment, the relays in the subgroup may cooperate and produce the output jointly. For example, consider the subgroup 1 with relays 1 and 2 in it. The relays 1 and 2 may generate soft values for $x_1$ and $x_2$ based on the received signal at the subgroup 1, wherein a "soft value" refers to a received amplitude itself. For example, in a binary decision case, if the received amplitude is greater than or equal to 0, it is decided that a hard value of "+1" is transmitted. Likewise, if the received amplitude is less than or equal to 0, it is decided that a hard value of "−1" is transmitted. Thus, if the received amplitude is 0.3, it is considered as +1. If the received amplitude is −0.3, it is considered as −1. Received amplitudes such as 0.3 and −0.3 are considered "soft values" but provide more information on what a transmitter has transmitted. Soft values also provide some degree of reliability. For example, a received amplitude of 0.8 is more convincing than a received amplitude of 0.2 that a transmitter has transmitted a hard value of +1. The soft values may be generated using log likelihood calculation. The relay that has the largest value may generate the modulation signal with order related to the cardinality of the subgroup (e.g., QPSK when the number of relays is equal to 2 in the subgroup). Soft values may be calculated per bit. The relays in the subgroup generate and compare the soft values. Each relay with the largest soft value per bit generates the modulation symbol using the I-Q modulation disclosed herein.

The architecture shown in FIG. 2 provides the selection transmit diversity gain in conjunction with spatial multiplexing gain. Furthermore, since information is shared among relays in the same subgroup, the burden of the synchronization among the relays required for full C-DIV is reduced. The output from one or more subgroups may be spread using the spreading code for the separation at the destination. Different spreading codes may be assigned from the destination (e.g., the base station) to the respective subgroups or the same spreading code may be assigned to all subgroups if there is some distinct and sufficient arrival time difference for the transmission from a subgroup.

The number of relays in the subgroup may be changed according to an instruction from a central controller, such as the base station. The following identifications support subgroup configuration change: 1) Subgroup Identification (Subgroup_ID)—Each subgroup is given its own identification; 2) Relay Station Identification (RS_ID)—Each relay station is given its own identification; 3) Master Relay Identification (Master_RS_ID)—Specifies a relay station responsible for collection information from other relays, decides which relay is responsible for transmission, and delivers this information to the relays in the subgroup; 4) Broadcast Identification (Broadcast_ID)—Specifies whether C-DIV or C-SM operation when all relays are included one group or subgroup.

In accordance with the present invention, a message according to Table (1) may be transmitted from a central controller to the respective relays when the subgroup configuration is formed or changed. For example, the number of bits (modulation order) each relay is responsible to detect may change, or the relays in the subgroup may change, etc.

TABLE (1)

| FIELD | DESCRIPTION |
| --- | --- |
| Subgroup_ID | Subgroup identification |
| Message_Type | Specifies whether the message is a full-type or differential-type of message |
| Bit_Map | Each bitmap location is tied with the parameters of interest |
| Scheme_Type | Forwarding scheme type |
| Num_Relays_Per_Subgroup | Number or relays in the subgroup. May be skipped if RS_ID clearly gives this information |
| RS_IDs | Relay station identifications in the subgroup. |
| Master_RS_ID | Identification of master relay station that coordinates decision |
| Mod_Orders | Set of modulation order (number of bits) relay station is responsible to detect. |
| Bit_Indices | Set of bit position indices responsible for by the subgroup based on Mod_Orders |
| Spreading | Seed for generating spreading sequence for transmission from the subgroup |

When the Master_RS_ID field is set (present), each relay station in the subgroup provides the information necessary for decision to the master relay station. The master relay station compares the information including one of itself, decides which relay station has the best received information, and informs its decision to the relay stations in the subgroup. If Master_RS_ID is not set, each relay station is responsible for delivering its information to other relay stations and for deciding whether to transmit or not. The Scheme_Type field relates to a type of forwarding scheme used to transmit data, such as a space time coding scheme, a selection diversity scheme and a beamforming scheme, for example.

The Mod_Orders field contains the set of modulation orders supported by the system. For example, it may be Mod_Orders={QPSK, 8-PSK, 16-QAM, 64-QAM}. The Bit_Indices field contains the set of bit indices each subgroup is responsible to detect based on Mod_Orders. For example, when Mod_Orders={QPSK, 8-PSK, 16-QAM, 64-QAM}, Bit_Indices={0, (0, 1), (0, 1), (0, 1, 2)}.

When the spreading field is set, the necessary information for generating a spreading sequence for the transmission from the subgroup is provided. If not present, each relay in the subgroup may use subgroup-specific information, e.g. a Subgroup_ID, to generate the spreading sequence for the transmission from the subgroup.

The message of Table 1 is preferably for its corresponding subgroup. This is desirable when the formation of a subgroup or a subgroup configuration change is more or less frequent than in mobile ad hoc networks. When the change is not frequent, one large message with all subgroup identifications, relay station identifications in the subgroups, master relay stations, and spreading information is reliable.

The number of bits required to describe each field in the message is configurable depending on certain factors, such as the number of relays in the subgroup and the supporting set of modulations, for example.

When only a subset of fields in the message is reconfigured in the subgroup, a differential type of message may be transmitted. A Message Type field can be added in the message to specify whether the message is a full-type or differential-type of message. When the message type is specified as "differential", the Bit Map field is attached. Each bitmap position is tied with the parameters of interest. For example, a 5 bit bitmap is considered and tied with [RS IDs, Master_RS_ID, Mod_Orders, Bit_Indices, Spreading]. When the bitmap is set to [1 1 1 0 0], it specifies that RS_IDs, Master_RS_ID and Mod_Orders are changed in such a way that follows the bitmap field. Accordingly, when there is a minor change in the message, it is not necessary to send an entire message. Rather, the fields that change may simply be specified.

When all relay stations are included in a group (or subgroup), a message according to Table (2) may be broadcast.

TABLE (2)

| FIELD | DESCRIPTION |
| --- | --- |
| Broadcast_ID | Specifies the message is for all relay stations |
| Mode_of_Operation | Specifies C-SM or C-DIV operation. May be omitted if two Broadcast_IDs one for C-SM and the other for C-DIV are defined |
| Mod_Order | Set of modulation order (number of bits) relay station is responsible to detect if C-SM is invoked |
| Bit_Indices | Set of bit position indices responsible for by relay based on Mod_Orders |

Figure 3:
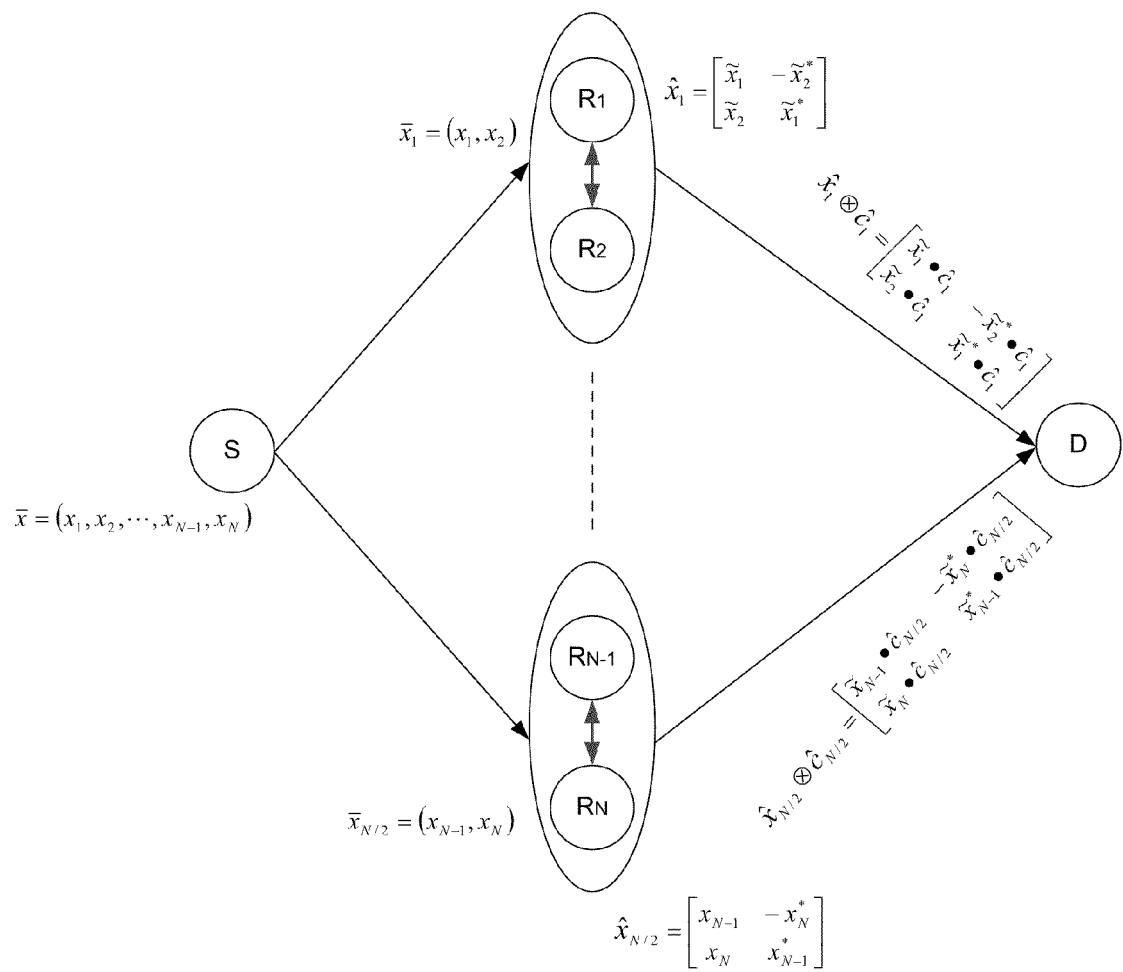

Referring to FIG. 3, a second exemplary architecture (architecture 2) is illustrated combining C-DIV and C-SM. Relays are placed into subgroups in a similar fashion as in the architecture of FIG. 2. As shown, a simplified example where each subgroup has two relays is presented for brevity. It is noteworthy, however, that the scope of the invention should not be construed as limited to this simplified exemplary presentation. A subgroup may be responsible to detect a subset of transmitted data streams and the output from each subgroup is an STBC-encoded detected data stream. In one embodiment, Alamouti encoding may be implemented.

Higher dimensional STBC may further be implemented by placing more relays into a subgroup. Note that if the number of relays is greater than the dimension of STBC, then the selection gain may be incorporated into the architecture. For example, assume that the number of relays is three and that a 2×2 Alamouti encoding is employed. Thereafter, two out of three relays may be chosen, which gives the best overall reception quality, and the Alamouti encoding may be applied over the two chosen relays. The output from the subgroup is further spread using a group-specific spreading code to facilitate the destination to reduce the interference. The transmission rate at the output of relays may be the same as in the architecture of FIG. 2 and is given in Equation (1) above.

Figure 4:
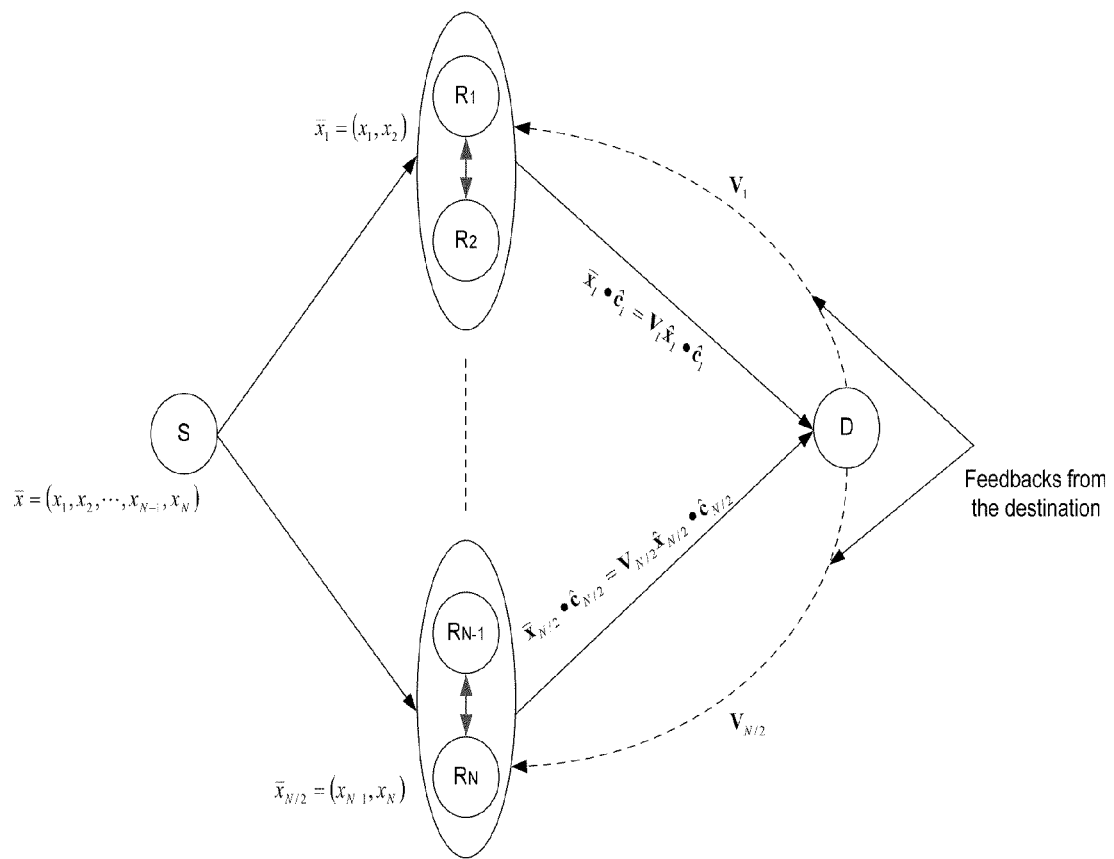

Referring to FIG. 4, in an alternative embodiment (architecture 3), the destination (e.g., base station (BS)) may be equipped with more than one antenna element. The channel between a subgroup of relays and the destination may be stable and maintained if the relays are fixed. The received signal from a subgroup is given by Equation (2), where the channel between the i-th subgroup and the destination with multiple receive antennas is represented by matrix $H_i$ in Equation (3), where $n_i$ and r are the number of relays in the i-th group and the number of receive antennas at the destination, respectively.

$$y_i = H_i \hat{x}_i + n_i \qquad (2)$$

$$H_i = \begin{bmatrix} h^i_{11} & h^i_{12} & \cdots & h^i_{1N_i} \\ h^i_{21} & h^i_{22} & \cdots & h^i_{2N_i} \\ \vdots & \vdots & \ddots & \vdots \\ h^i_{r1} & h^i_{r2} & \cdots & h^i_{rN_i} \end{bmatrix} \qquad (3)$$

In one embodiment, $\hat{x}_i = [\hat{x}_1^i \ \hat{x}_2^i \ \ldots \ \hat{x}_{N_i}^i]^T$ represents the transmitted data from the i-th subgroup and $n_i = [n_1 \ n_2 \ \ldots \ n_r]^T$ represents the noise sample vector at the receive antennas. If we apply the singular value decomposition to $H_i$, then we have the formula presented in Equation (4) below, where $U_i$ and $V_i$ are orthogonal eigenvectors of the channel, respectively, and $\Sigma_i$ is the diagonal matrix with the eigen values of the channel as elements.

$$H_i = U_i \Sigma_i V_i^H \qquad (4)$$

The number of nonzero elements of $\Sigma_i$ represents the number of parallel channels created by the multiple relays in the i-th subgroup and multiple receive antennas at the destination. The destination feedbacks Vi to the i-th subgroup and the transmitted data from the i-th subgroup is precoded as provided in Equation (5), where the column vector $\bar{x}_i$ has a column vector of order $N_i$ which may be spread by a subgroup-specific spreading code $\hat{c}_i$.

$$\bar{x}_i = V_i \hat{x}_i \qquad (5)$$

Referring to FIG. 4, if the destination has the capability of separating incoming data streams from the subgroups, then we may not need to use $\hat{c}_i$. Since the channel between the i-th subgroup and the destination is fixed, the update of Vi will be infrequent.

In accordance with the present invention, a message according to Table (3) may be transmitted from a central controller to respective relays when subgroup configuration is formed or changed, such as when the number of bits (modulation order) each relay is responsible to detect changes, and when the relays in the subgroup changes, for example. Here, the Weighting_Coefficient field contains a set of weighting factors (amplitude and/or phase) applicable to the transmitters (antennas) at the relays in the subgroup.

TABLE (3)

| FIELD | DESCRIPTION |
| --- | --- |
| Subgroup_ID | Subgroup identification |
| Num_Relays_Per_Subgroup | Number or relays in the subgroup |
| RS_IDs | Relay station identifications in the subgroup |
| Weighting_Coefficients | Set of weighting coefficients assigned to the subgroup with Subgroup_ID |
| Mod_Orders | Set of modulation order (number of bits) each relay station is responsible to detect |
| Bit_Indices | Set of bit position indices responsible for by the subgroup based on Mod_Orders |
| Spreading | Seed for generating spreading sequence for transmission from the subgroup |

In the above, exemplary embodiments with no reference to a channel coding scheme have been disclosed. The reception quality in the above embodiment may be improved if a channel coding scheme is used and the decoding is done at the relays before forwarding to the destination, as provided in more detail below.

Figure 5:
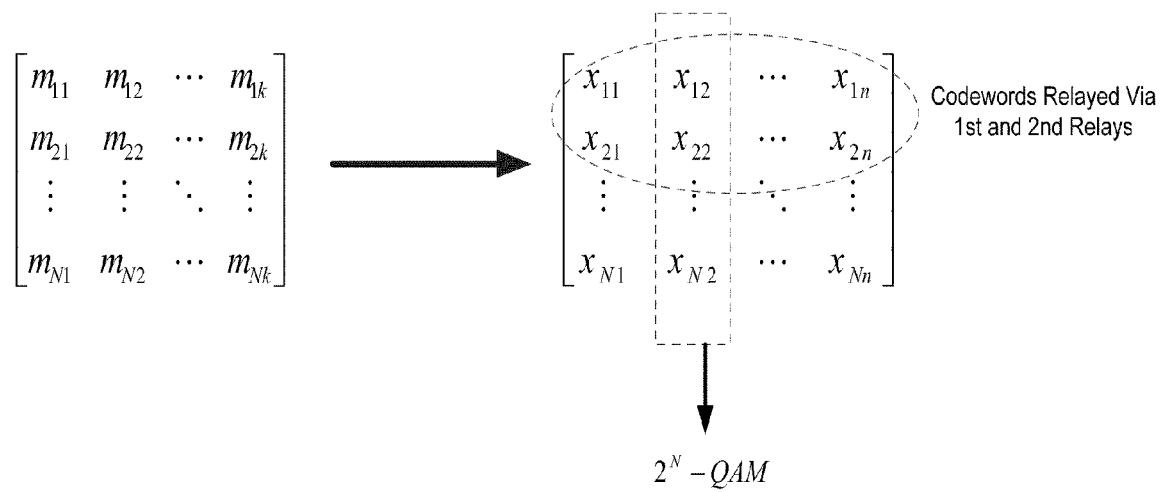
FIG. 5 is a matrix diagram of a method of encoding data at a source node, in accordance with one embodiment.

FIG. 5 shows an exemplary encoding and transmission method at the source, without limitation. That is, depending on implementation other encoding and transmission methods are possible. As shown, input data is placed into N×k array and each row is encoded using (n,k) channel code, which may be one of a linear block code, convolutional code, turbo code, low density parity check (LDPC) code, product code, or other suitable coding scheme.

In one embodiment, encoded symbols are placed into N×n array. Each column of N×n array is transmitted using $2^N$-ary modulation symbol. A subgroup of relays is responsible to detect and demodulate some codewords assigned to it. For example, assume that a first subgroup (subgroup 1) comprises two relays, (e.g., a 1st and 2nd relay). These two relays cooperate to detect and demodulate 1st and 2nd codewords, respectively. Two relays exchange the information and construct the followings as inputs to the decoders, according to Equation (4), where $\max(x_{ij}(R_1), x_{ij}(R_2))$ is the maximum (i.e., the better reception quality) of the j-th coded symbols in the i-th codeword received at the relays 1 and 2, respectively.

$$\begin{bmatrix} \hat{x}_1 \\ \hat{x}_2 \end{bmatrix} = \begin{bmatrix} \max(x_{11}(R_1), x_{11}(R_2)) & \ldots & \max(x_{1n}(R_1), x_{1n}(R_2)) \\ \max(x_{21}(R_1), x_{21}(R_2)) & \ldots & \max(x_{2n}(R_1), x_{2n}(R_2)) \end{bmatrix} \quad (6)$$

In one embodiment, the better reception quality may be determined by the instantaneous received signal amplitude, the received signal-to-noise ratio (SNR), or any other metric. Decoders at the relays 1 and 2 try to decode codewords after all the necessary information is exchanged. When the decoding is successful, a relay re-encodes and transmits the data to the destination. When the decoding is failed, a relay may forward or input nothing to the decoder. Extra error correcting capability at the destination may take up the role of handling the errors. Note that the encoding in FIG. 5 may be considered as inner in concatenated coding (e.g., Reed-Solomon (RS) coding) as outer and convolutional coding as inner.

In one embodiment, relays are involved in the decoding and re-encoding of inner code. In addition, an adaptive operation may be implemented in the relays. If the overall received quality for a codeword in a relay does not meet a certain threshold, then the decoding may be skipped and the relay may forward the received input to the decoder. Accordingly, the example channel coding discussed here may be applied to the architectures and embodiments disclosed earlier.

For example, the input to the decoders for subgroup 1 is given in Equation (6) and may be applied to architectures 1, 2, and 3. In architecture 1 shown in FIG. 2, the output from the subgroup 1 may be successfully re-encoded data stream(s) or input to the decoder(s). In architecture 2 shown in FIG. 3, the output from the subgroup 1 may be successfully re-encoded data stream(s) or just input to the decoder(s) and space time encoded. The preceding using the feedback from the destination may be applied in architecture 3 depicted in FIG. 4 to the output from the subgroup 1 which may be successfully re-encoded data stream(s) or just input to the decoder(s). Additionally, the message formats described above with respect to the different architectures may be used in conjunction with channel coding.

In accordance with another embodiment, the improved reception quality in conjunction with the channel coding and relays may be implemented as follows. The source transmits the encoded stream to relays. Each relay belongs to a subgroup. Each subgroup is responsible to generate a subpacket after successfully decoding the incoming data stream. For the simplicity and brevity, we concentrate on the subgroup 1 with two relays, although it is appreciated that different embodiment may have different implementations.

Denote the subpacket 1 as $S_1 = \lfloor C_{1,1} C_{1,2} \ldots C_{1,t(1)} \rfloor$ where $t(1)$ is the size of the subpacket 1 in terms of bit. Collection of modulation symbols may be represented as $S_1(m) = \lfloor S_{1,1} S_{1,2} \ldots S_{1,t(1)/N} \rfloor$ where we assume that $S_{i,j} = S_{i,j}^I + jS_{i,j}^Q$ is the complex and N is the order of modulation. Collection of modulation symbols is further split into two sub-collections as $S_{1,1}(m) = \lfloor S_{1,1} S_{1,2} \ldots S_{1,t(1)/N/2} \rfloor$ and $S_{1,2}(m) = \lfloor S_{1,t(1)/N/2+1} S_{1,t(1)/N/2+2} \ldots S_{1,t(1)/N} \rfloor$. For the first two modulation symbol durations, relays 1 and 2 transmitted pursuant to Equation (7).

$$T = \begin{bmatrix} \tilde{S}_1 & 0 \\ 0 & \tilde{S}_2 \end{bmatrix} = \begin{bmatrix} S_{1,1}^I + jS_{1,t(1)?N/2+1}^Q & 0 \\ 0 & S_{1,t(1)/N/2+1}^I + jS_{1,1}^Q \end{bmatrix}. \quad (7)$$

Accordingly, additional diversity gain known as signal space diversity gain is added to the existing coding gain. Note that the above explanation is made assuming the subgroup with two relays, but it may be generalized to more than two relay cases.

Depending on implementation, according to the number of subgroups in the group, the proposed schemes and architectures have tradeoffs between two extremes: one is C-DIV and the other is C-SM. Therefore, the instantaneous type of subgroups is a factor characterizing desired performance measures that the whole system may experience. That is, the desired performance measure may be improved or degraded according to how to construct the respective subgroups and how to reconstruct those subgroups. In this section, we make high-level descriptions on constructing/reconstructing subgroups (or "subgrouping"). The subgrouping may be done in a distributed manner, in a centralized manner, and/or in a combined manner and may be done periodically at regular intervals or may be done at necessity.

In accordance with one embodiment, a quality-based subgrouping technique may be implemented. The subgrouping techniques based on quality include those techniques using the average signal quality on multiple data channels, the average link quality between the associated candidate relays, and/or the instantaneous signal or link quality. In this context, the term "average" refers to the averaging of multiple channels over a certain time window, and the term "instantaneous" refers to the instantaneous averaging of signal quality or link quality over multiple channels. We define "signal quality" as a measure characterized in physical layer, and further define "link quality" as a measure characterized in the upper layer, such as MAC layer or data link layer.

Figure 6:
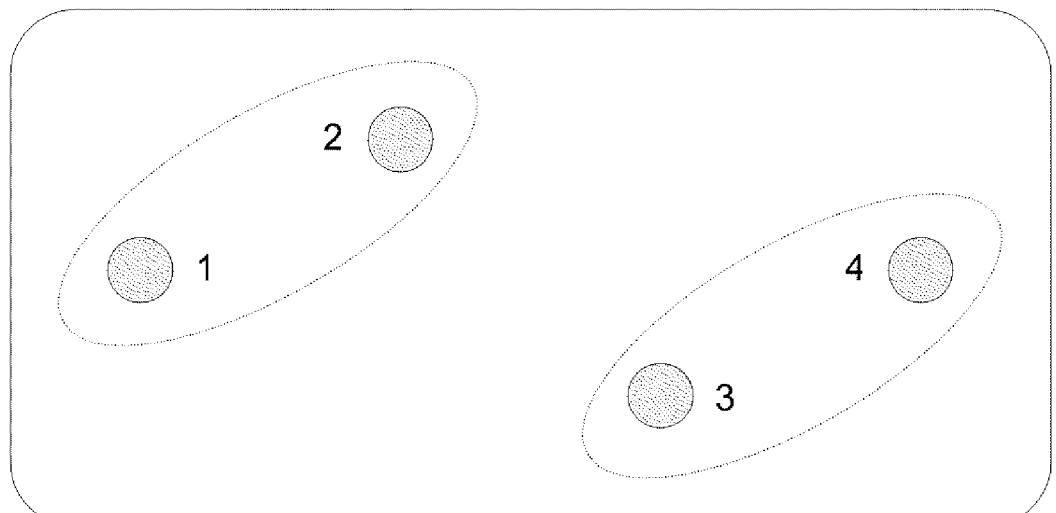
FIG. 6 is block diagram illustrating an example of signal quality-based relay station grouping, in accordance with one embodiment.
Figure 6:
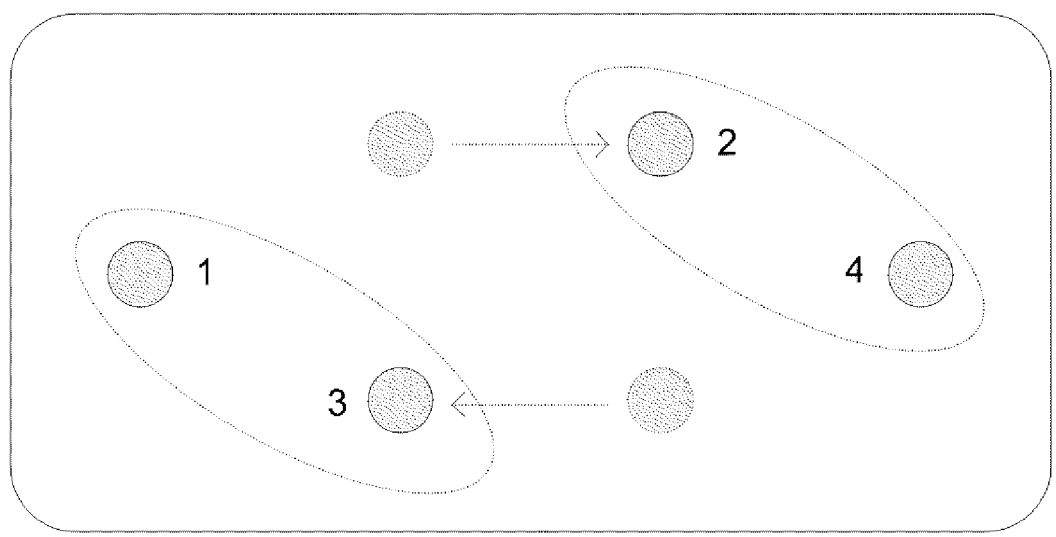

FIG. 6 shows a simple example of a subgrouping technique based on signal quality in a network with only four relays, excluding the source and destination nodes. Assuming that the signal quality of a wireless link is wholly dependent upon the distance between the associated two relays, we have the subgrouping solution of {{1, 2}, {3, 4}}. If there are certain changes in the locations of some relays as shown in subfigure FIG. 6(b), then the solution in terms of signal quality may be updated as {{1, 3}, {2, 4}}.

In accordance with one embodiment, the term "link quality" as used herein does not particularly correspond to or is equivalent to "signal quality". That is, even though the signal quality of a certain wireless link is the best out of a certain number of candidates, the wireless link may not be the best one in terms of link quality if the link is heavily congested.

Figure 7:
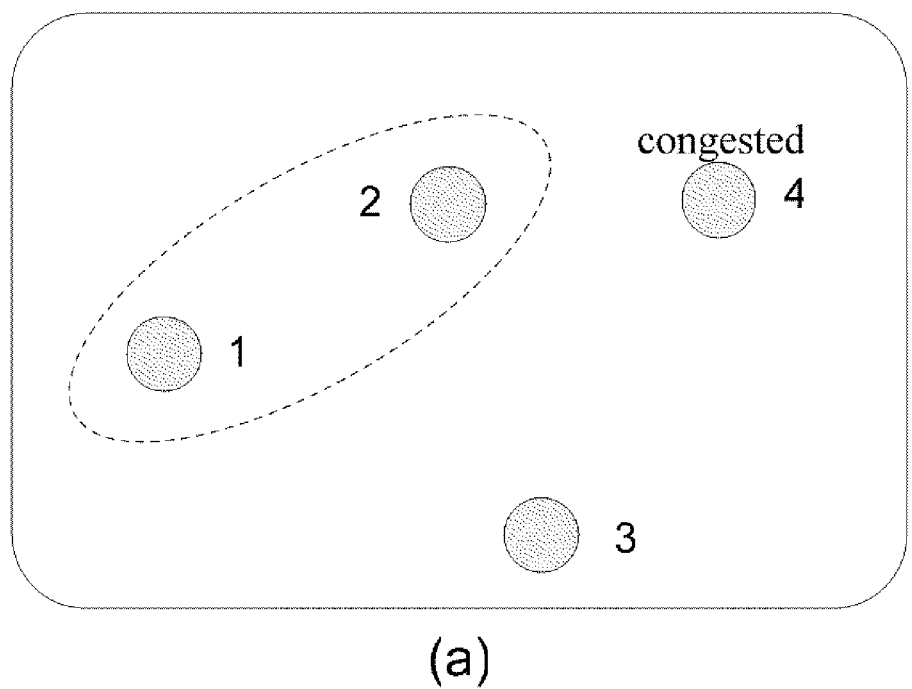
FIG. 7 is block diagram illustrating an example of link quality-based relay station grouping, in accordance with one embodiment.
Figure 7:
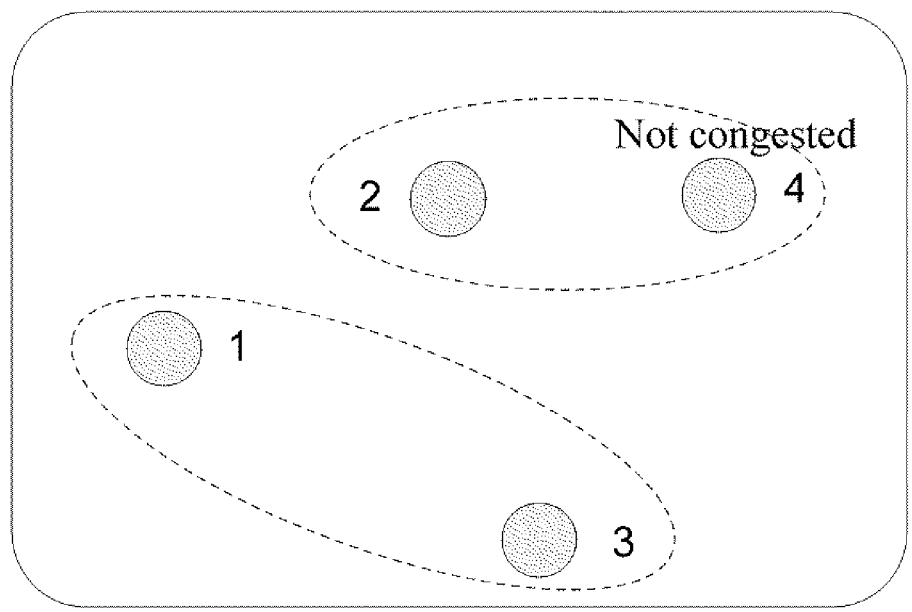

FIG. 7 illustrates an example for link quality-based subgrouping techniques. In subfigure FIG. 7 (a), relay 4 is heavily congested. Then even though the signal quality between relays 2 and 4 is the best, setting up the wireless link does not guarantee any increase in additional data rate because of the existing congestion. Thus, in one embodiment, relay 2 may invite relay 1 to subgroup with relay 2. In contrast, if relay 4 is not congested, then relay 2 may have the best feasible candidate of relay 4 for a subgroup and relay 1 has the best one of relay 3 as shown in the subfigure FIG. 7 (b).

In accordance with one embodiment, a traffic load-based subgrouping technique may be implemented, wherein each relay responsible for subgrouping shall choose one or more relays based on the observed or anticipated volume of traffic per unit time. This category also includes subgrouping techniques using load-balancing, whether coarse or fine, as well as those using a fairness criteria. Subgrouping techniques based on link quality are distinguishable from subgrouping techniques based on traffic load. That is, in the former, the index of additional throughput that may be achieved in a certain link is examined; in the latter, different indices, such as load-balancing and fairness, are the major concerns on top of the concerns of the former.

Figure 8:
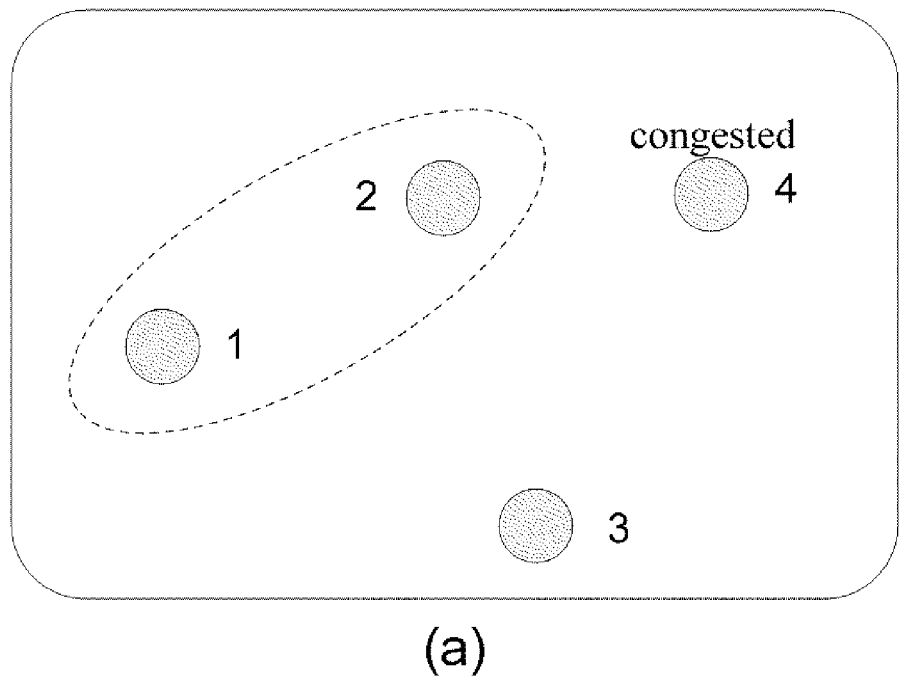
FIG. 8 is block diagram illustrating an example of load-based relay station grouping, in accordance with one embodiment.
Figure 8:
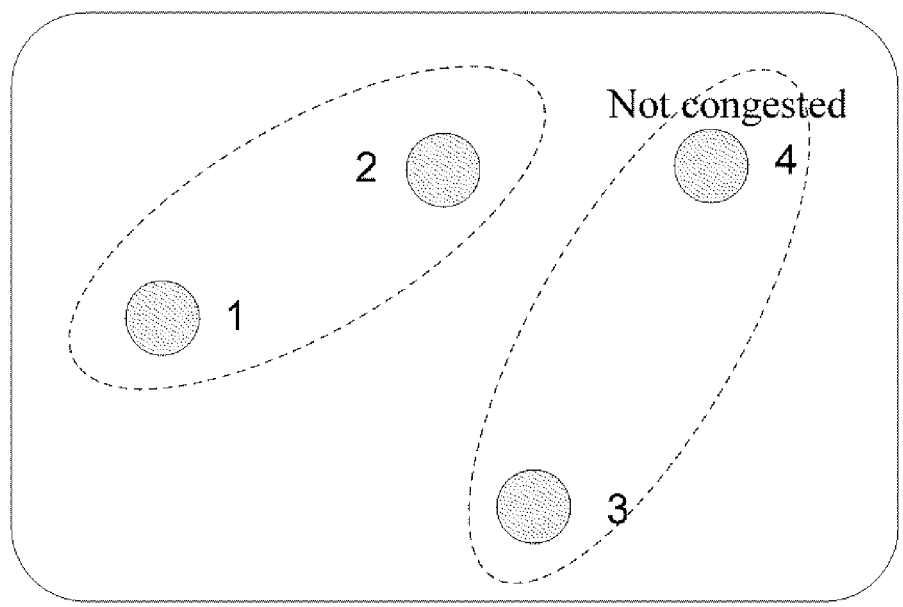

FIG. 8 shows an example of load-based subgrouping illustrating the difference between the above-referenced techniques. Referring to the example illustrated in FIG. 7, in one embodiment, relay 1 is subgrouped with relays 2, 3 and 4. In this exemplary scenario, even though there exists the best feasible solution for the subgrouping in terms of "link quality" that the respective relays may experience, the best solution does not always guarantee the best overall performance of the network.

For example, even though there is a higher increase in additional link throughput when we have a configuration of subgroups as in FIG. 7 (b), the increase in additional link throughput does not provide any increase in actual utility if there is no traffic load that utilizes the additional throughput. In this case, the configuration of subgroups in FIG. 8 (b) may be better than that in FIG. 7 (b) in terms of actual utility that the network may experience.

Depending on implementation, it is possible that the present invention may take the form of an entirely hardware embodiment, an entirely software embodiment or an embodiment containing both hardware and software elements. A software embodiment may include, but not be limited to, to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Other components may be coupled to the system. Input/output or J/O devices (including but not limited to keyboards, displays, pointing devices, etc.) may be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips may be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product may be any product that includes integrated circuit chips, ranging from toys and other low-end applications to advanced computer products having a display, a keyboard or other input device, and a central processor.

Therefore, it should be understood that the invention may be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for communicating data from a source to a destination using a plurality of relay stations in a wireless communication system, the method comprising:

receiving, at a first relay station of the plurality of relay stations, a data signal from the source;

sharing information with at least a second relay station of the plurality of relay stations for transmitting the data signal to the destination, wherein the first relay station and the at least a second relay station belong to a first relay station group of a plurality of relay station groups;

determining a forwarding scheme for transmitting the data signal;

spreading the data signal using a spreading code; and transmitting the spread data signal to the destination using the forwarding scheme, wherein the plurality of relay stations are divided into the plurality of relay station groups based on traffic load per a time unit, wherein a same spreading code is used in the first relay station group, the same spreading code different from a spreading code used in a second relay station group of the plurality of relay station groups, and wherein the information comprises at least an instantaneous amplitude, a signal-to-noise ratio, a signal-to-interference plus noise ratio, reliability of the data signal, a decoded data signal or reliability of the decoded data signal.

2. The method of claim 1, wherein the forwarding scheme comprises a space time coding scheme, a selection diversity scheme or a beam forming scheme.

3. The method of claim 1, wherein one or more relay stations in each of the plurality of relay station groups provide a diversity gain for the data signal.

4. The method of claim 1, wherein one or more relay stations in each of the plurality of relay station groups provide a spatial multiplexing gain for the data signal.

5. The method of claim 1, wherein the forwarding scheme is based on a command received from the destination or a decision made by each of the plurality of relay station groups.

6. The method of claim 1, wherein a number of relay stations in each of the plurality of relay station groups varies according to a function of time.

7. The method of claim 1, wherein a number of the plurality of relay station groups varies according to a function of time.

8. The method of claim 1, wherein one or more relay stations in each of the plurality of relay station groups is involved in the forwarding scheme.

9. The method of claim 1, wherein the first relay station is a mobile station or a fixed station.

10. The method of claim 1, wherein the received data signal is channel coded.

11. The method of claim 1, wherein a number of relay stations in each of the plurality of relay station groups is variable according to a base station instruction.

12. The method of claim 1, wherein each relay station in a relay station group of the plurality of relay station groups receives a message transmitted from a base station when the relay station group is configured.

13. The method of claim 12, wherein the message comprises at least:
an identification of the relay station group;
message type information;
bit map information;
a type of forwarding scheme;
a number of relay stations in the relay station group;
identifications of the relay stations in the relay station group;
a set of weighing coefficients if the message comprises a specific type of forwarding scheme;
an identification of a master relay station if the message comprises a specific type of forwarding scheme;
a modulation order;
bit position indices; or
information for generating a spreading sequence for a transmission from the relay station group.

14. The method of claim 12, wherein the message comprises at least:
a broadcast identification;
a mode of operation;
modulation order; or
bit position indices.

* * * * *